United States Patent [19]

Loskill

[11] 3,999,278
[45] Dec. 28, 1976

[54] METHOD OF ASSEMBLING A WIPER BLADE ASSEMBLY

[75] Inventor: Lawrence R. Loskill, Gary, Ind.
[73] Assignee: The Anderson Company, Gary, Ind.
[22] Filed: Jan. 15, 1976
[21] Appl. No.: 649,566

Related U.S. Application Data

[62] Division of Ser. No. 354,529, April 26, 1973, Pat. No. 3,953,908.

[52] U.S. Cl. .................................. 29/450; 29/452; 29/453
[51] Int. Cl.² ......................................... B23P 11/02
[58] Field of Search ............ 29/446, 450, 451, 453, 29/452; 15/250.36

[56] References Cited

UNITED STATES PATENTS

| | | | |
|---|---|---|---|
| 2,209,403 | 7/1940 | Kittner et al. ................ | 29/451 UX |
| 2,590,264 | 3/1952 | Meyers et al. ................ | 29/453 UX |
| 2,945,715 | 7/1960 | Burrell ........................... | 29/451 UX |
| 2,966,692 | 1/1961 | Zaiger ........................... | 15/250.36 |
| 3,006,016 | 10/1961 | Anderson ....................... | 15/250.36 |
| 3,208,091 | 9/1965 | Golub et al. ................... | 15/250.36 |
| 3,605,231 | 9/1971 | Kistner et al. ................. | 29/451 X |

FOREIGN PATENTS OR APPLICATIONS

692,226   7/1965   Italy ................................ 15/250.36

Primary Examiner—Charlie T. Moon
Attorney, Agent, or Firm—Wegner, Stellman, McCord, Wiles & Wood

[57] ABSTRACT

A method for assembling a wiper blade with a wiper arm wherein the wiper blade consists of a backing strip having keyhole-shaped slots therein and an open aperture at one end of the strip, along with a multifarious wiping element having a plurality of T-shaped projections for fitting in the keyhole-shaped slots in the backing strip and a projection at the end thereof for buttoning the backing strip to the wiping element upon stretching the wiping element. The steps of the method define the sequence of steps of aligning the projections with the slots and stretching the wiping element to align the projection with the open aperture whereupon release of the stretched wiping element completes the assembly.

1 Claim, 17 Drawing Figures

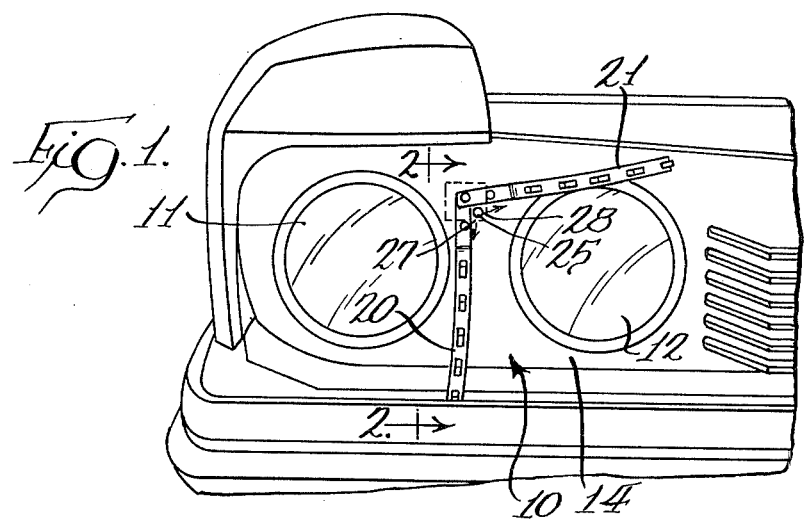
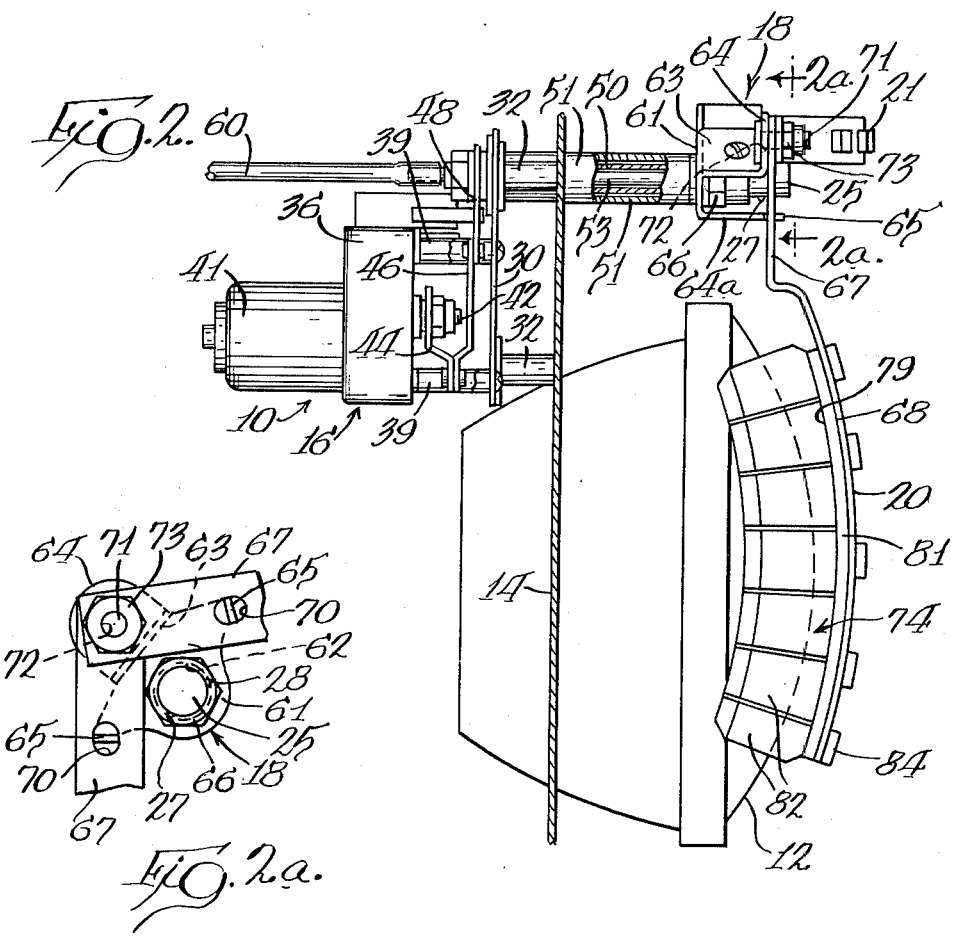

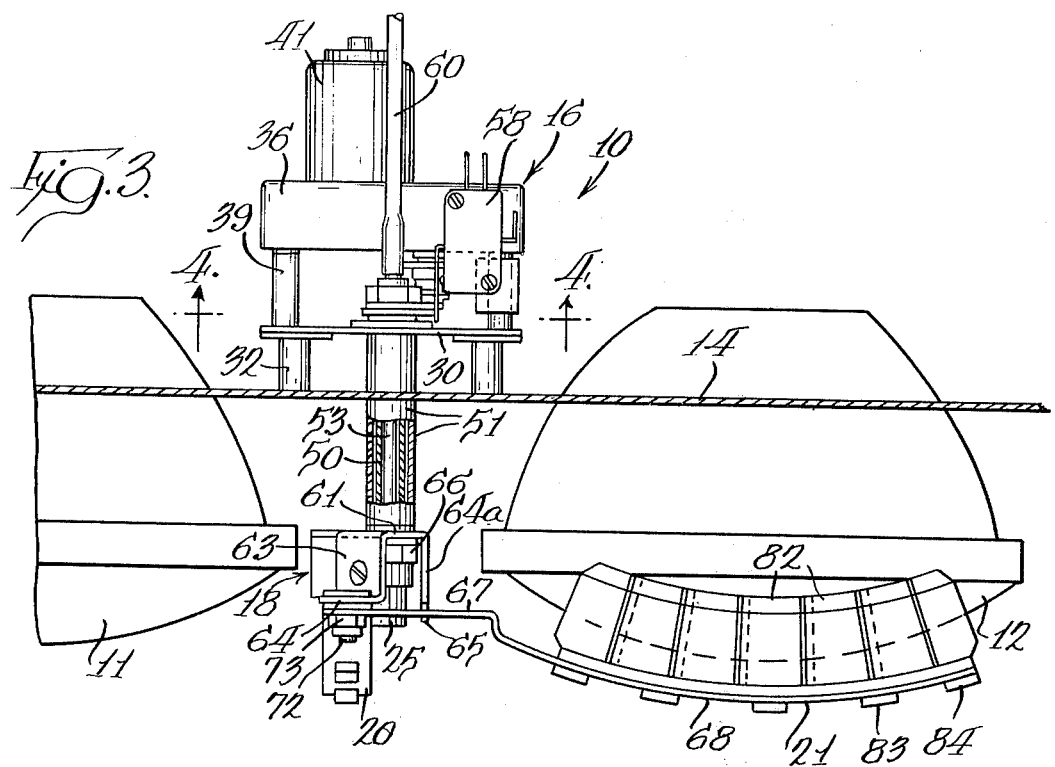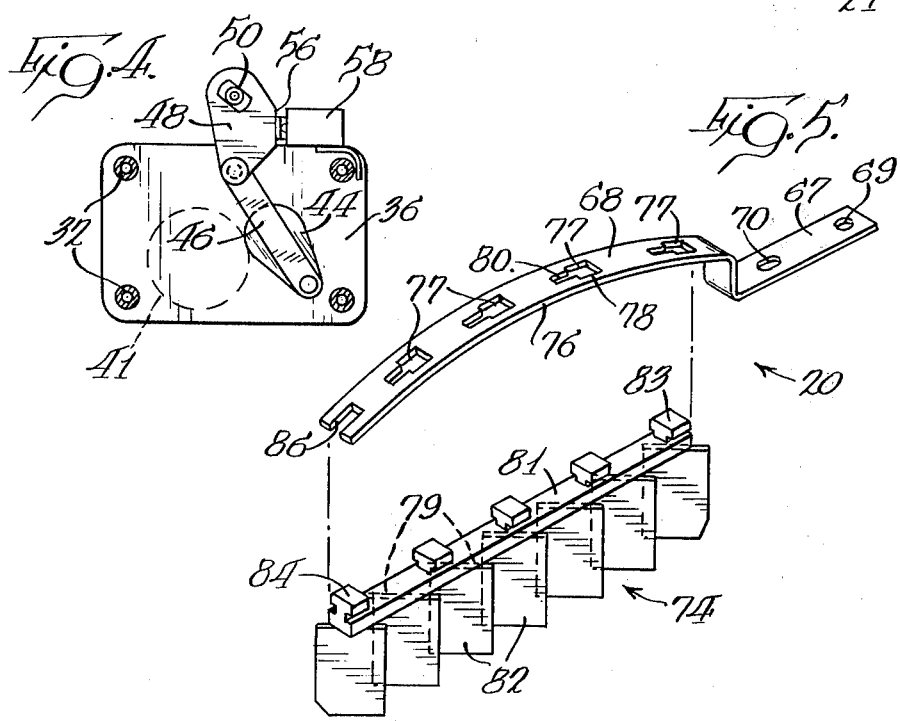

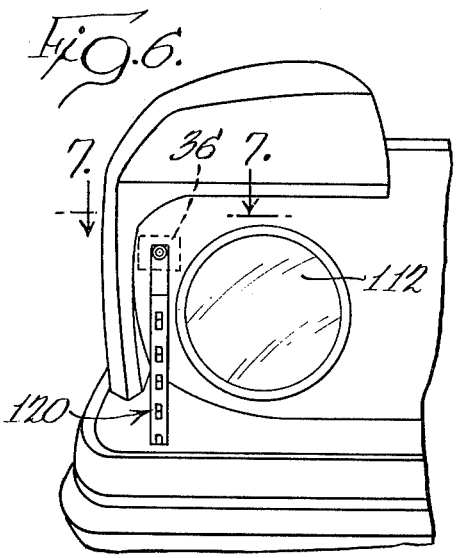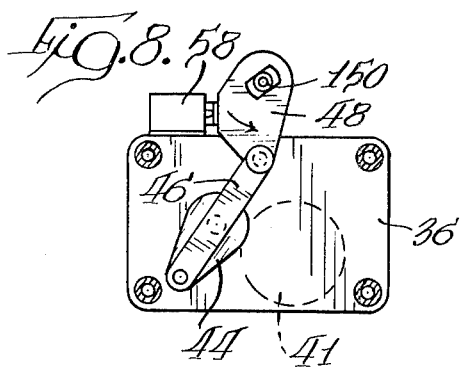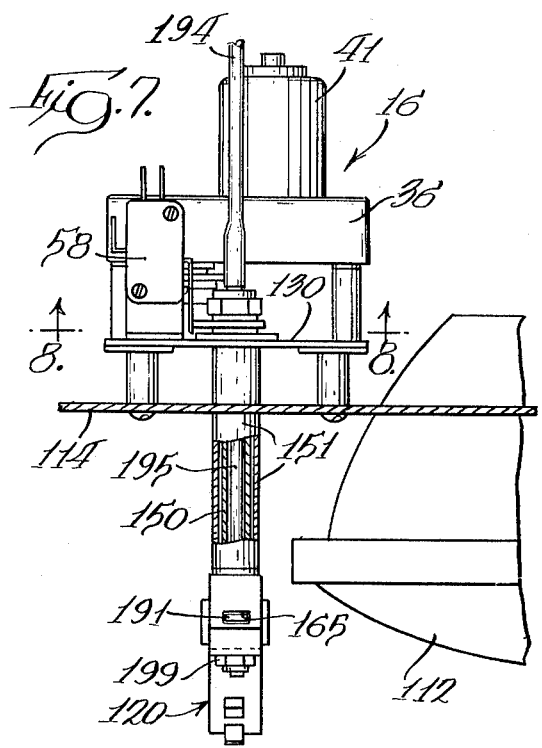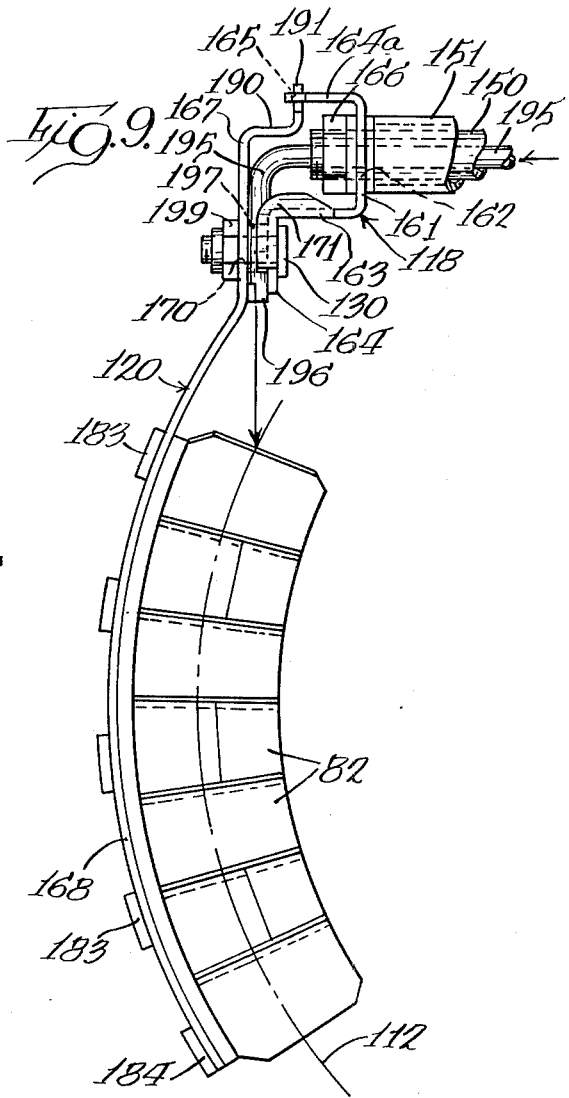

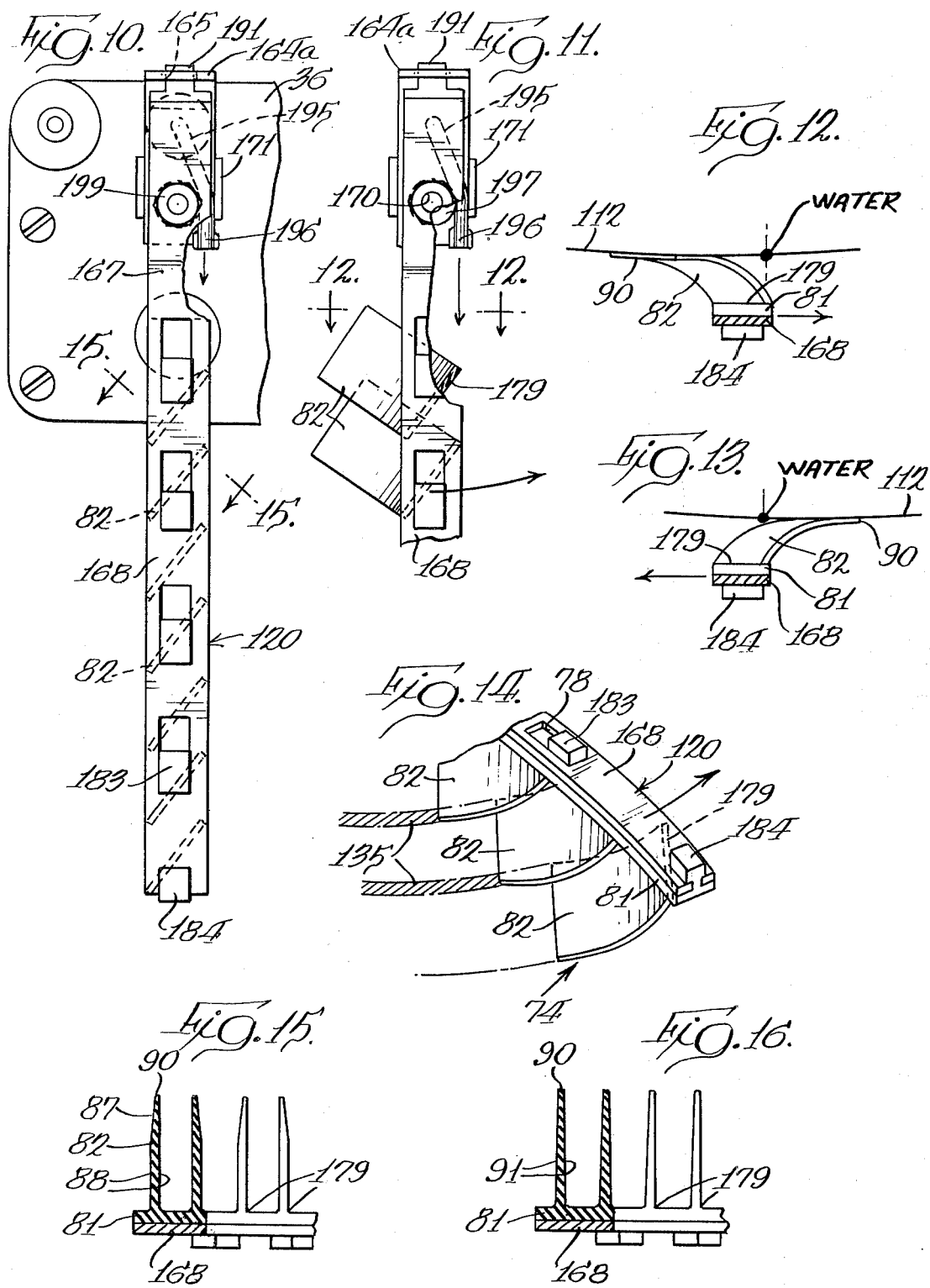

METHOD OF ASSEMBLING A WIPER BLADE ASSEMBLY

This is a division of application Ser. No. 354,529 filed Apr. 26, 1973, now U.S. Pat. No. 3,953,908.

BACKGROUND OF THE PRESENT INVENTION

While wiper blades for cleaning windshields have been provided in the past, it has been within the last decade that it has been found desirable to provide wipers for headlamps, particularly since headlamps are close to the ground and subjected to a lot of road elements and weather conditions that obstruct the illumination from said lamps. Moreover it has been known to provide singular and dual wiper blades for wiping singular or dual sets of headlamps.

There have, however, been deficiencies in the prior known constructions. First, the wiper blades themselves have not been found suitable for wiping headlamps, nor have they been found to provide a rigid enough construction to withstand the more severe environment associated with headlamps.

An additional disadvantage in prior known constructions is that the nozzle assemblies have not been designed to adequately spray cleansing fluid on the headlamps. A still further disadvantage in prior constructions is that they fail to provide a simple and reliable driving arrangement for the wiper blades that oscillates them through their respective wiping cycles.

SUMMARY OF THE PRESENT INVENTION

In accordance with the present invention, a single or dual-bladed wiper assembly is provided for spraying cleaning fluid on and wiping single or dual headlamps in a more efficient, more reliable and yet more simplified manner than heretofore known in the prior art.

In the case of dual headlamp vehicles, two wiper arm and blade assemblies are provided, fixed with respect to each other in an appropriately spaced relationship to pivot about an axis common to both headlamps. Each of the wiper blade assemblies includes a combined arm and blade backing strip element with the backing strip portion having a plurality of key-shaped slots therein along with an open-ended aperture at the outboard end thereof. By an appropriate gear setting of the drive mechanism, dual headlamps can be wiped with a single arm and blade assembly with the pivot located so that an approximately 90° arc of movement will clean both headlamps. A multifarious wiping element is provided for each blade backing strip element with the back of said wiping element including a plurality of projections that fit within the key slots. The outboard end of the multifarious wiping element is grasped and the element is stretched after the other projections are positioned in the key slots to a condition where a projection on said outboard end of the element enters the open-ended aperture at the outboard end of the backing strip. Other buttoning or fastening techniques are provided for attaching the wiping element to the backing strip.

The multifarious element has a plurality of angularly disposed facets, set at desired intervals and tapered so that there is a nesting, one beyond the other, in a cooperative endeavor as the wiping assembly is oscillated across the surface of the headlamp.

The cleaning feature of the multifarious element is based on the unique application of the plurality of facets. The design and arrangement of the facets allow them to clean irregular surfaces, which in this case are spherical, convexly curved, round, oval or rectangular luminary devices such as headlamps or the like.

The main drive shaft provides a fluid passage for conducting cleansing fluid to fluid spray nozzles at the end of the drive shaft adjacent the single or dual headlamps.

An additional feature of the present invention as applied to dual headlamps is that the spray nozzle is provided with dual spray apertures, one for each headlamp, that oscillates with the main drive shaft so that the sprayed fluid hits the headlamps at points directly adjacent and in front of the oscillating wiping elements, rather than merely centrally of the headlamps, thereby improving the cleansing action of the wiping assembly.

In the case of a single headlamp, a single arm and blade assembly is mounted in position with respect to the headlamp such that the drive shaft will oscillate the assembly across the surface of the headlamp with the multifarious wiping element performing the cleaning function. Fluid through said drive shaft is sprayed on said headlamp always just ahead of and between the multifarious facets of the wiper.

Fixed to the end of the main drive shaft is a bracket which has, for each arm and blade element, two operating ends spaced from each other and spaced from said drive shaft. One operating end of the bracket is connected to the arm and blade element with the other operating end also engaging said element at a location spaced from said first operating end for the purpose of positive oscillation of said element.

For the purpose of oscillating the arm and blade assemblies, either single or dual, a rotary motor is provided along with a crank assembly drive thereby that converts rotary motion of the motor into oscillating motion of the main drive shaft. Part of this crank linkage engages a stop-switch that controls the parking of the entire wiper assembly.

BRIEF DESCRIPTION OF THE DRAWINGS

FIG. 1 is a fragmentary view of the front of an automobile with my improved dual headlamp wipers installed;

FIG. 2 is a fragmentary side view of the headlamp wipers and drive mechanism, taken generally along line 2—2 of FIG. 1;

FIG. 2a is a fragmentary front view of the mounting bracket on the drive shaft taken along line 2a—2a of FIG. 2;

FIG. 3 is a fragmentary top view of the dual headlamp wiper assembly of FIG. 1;

FIG. 4 is a cross-section of the drive linkage taken generally along line 4—4 of FIG. 3;

FIG. 5 is an exploded view of one of the wiper arm and blade assemblies;

FIG. 6 is a fragmentary view of the front of an automobile with my improved single headlamp wiper installed;

FIG. 7 is a fragmentary top view of the single headlamp wiper assembly of FIG. 6;

FIG. 8 is a cross-section of the drive linkage taken generally along the line 8—8 of FIG. 7;

FIG. 9 is an enlarged side elevation view of the end of the drive shaft and the wiper arm and blade element with the multifarious wiping element thereon;

FIG. 10 is a front view of the structure of FIG. 9 with the addition of the mounting plate;

FIG. 11 is a fragmentary portion of FIG. 10 with the hinged multifarious parts in contact with the headlamp;

FIG. 12 is a cross-sectional view taken on the line 12—12 of FIG. 11 showing the hinging of the multifarious parts;

FIG. 13 is a cross-sectional view similar to FIG. 12 except that the direction of movement of the arm and blade has been reversed thus reversing the hinging of the multifarious parts;

FIG. 14 is a schematic view of a portion of the arm and blade element with the hinging and overlapping relationship of the facets of the multifarious wiping element illustrated;

FIG. 15 is a cross-sectional view taken along the line 15—15 of FIG. 10; and

FIG. 16 is a cross-sectional view of a modified form of the facets of the multifarious element.

DETAILED DESCRIPTION OF THE PREFERRED EMBODIMENT

As seen in FIGS. 1–5 of the drawings, a dual wiper apparatus 10 is provided for wiping dual headlamps 11 and 12 mounted on the front grill panel 14 and support bracket of an automobile.

The dual wiper apparatus 10 generally includes a drive mechanism 16, a bracket and nozzle mechanism 18, and wiper arm and blade assemblies 20 and 21.

The drive mechanism 16 is connected to the grill panel 14 mounted on a support bracket and serves to oscillate the wiper arm and blade assemblies 20 and 21 across the headlamps 11 and 12 while the headlamps are being sprayed with fluid from an oscillating nozzle 25 having apertures 27 and 28 directing fluid on the headlamps 11 and 12, respectively. The nozzle 25 oscillates with the arm and blade assemblies 20 and 21 and directs cleaning fluid ahead of and through the blade portions of the assemblies 20 and 21 in a manner to be described more completely hereinafter.

The drive mechanism 16 has a mounting plate 30 fixed to the grill panel 14 and support bracket by spacers 32. Gear housing 36 is spaced from and is carried by the mounting plate 30 by threaded spacers 39. Motor 41 is mounted on the gear housing 36 and has an output shaft 42 that drives a crank 44 shown clearly in FIGS. 2 and 4. The crank 44 in turn drives a link 46 drivingly connected to a second link 48 fixed to the main drive shaft 50 oscillatably supported with respect to plate 30. Secured to the plate 30 is a hollow mounting sleeve 51 which passes through an opening in the grill panel 14 and through which sleeve 51 the drive shaft 50 passes. The shaft 50 oscillates within the fixed sleeve 51. The purpose of the crank 44 and the links 46 and 48 is to translate the rotary motion of motor 41 into the oscillating motion of drive shaft 50 to affect a back and forth wiping cycle of the arm and blade assemblies 20 and 21. By means of the proper selection of gear ratios and linkages 44, 46 and 48 the arc of oscillation of the shaft 50 can be varied to any desired degree. In the embodiment illustrated in FIGS. 1–5, the arc of oscillation is approximately 90°. As shown in FIG. 4, there is a camming surface 56 on the link 48 that engages a switch 58 for returning the blade assembly to a park position. The driver of the vehicle actuates the system by means of a control in the vehicle. Once actuated, the system oscillates a predetermined number of times with the last oscillation actuating the switch 58 to park the arm and blade assemblies.

As shown in FIGS. 2 and 3, a flexible fluid supply line 60 is connected to a conduit 53 which is provided for delivering fluid through the hollow interior of the main drive shaft 50 and which conduit 53 in turn communicates with the nozzle openings 27 and 28 in the nozzle 25 fixed to the end of the drive shaft 50. Since the nozzle 25 is fixed to the end of the drive shaft 50, the nozzle, the drive shaft 50 and the conduit 53 oscillate with the wiper arm and blade assemblies 20 and 21. With the conduit 53 oscillating with the drive shaft 50, the end portion of the supply line 60 connected to the conduit 53 will receive an oscillatory twisting action to which the material of the supply line 60 is capable of accommodating.

The bracket assembly 18 has a base portion 61 with an aperture 62 (FIG. 2a) therethrough. Spaced from the aperture 62 in the bracket 18 is an upturned flange 63 having a mounting tab 64 on the outer end thereof lying in a plane substantially parallel to the base portion 61. The base portion 61 also has a pair of upturned legs 64a spaced equally from said flange 63 and from the aperture 62. Each leg 64a has a lug 65 outwardly projecting from said leg.

The bracket assembly 18 is keyed on and secured to the drive shaft 50 by means of a fastener 66. Each arm and blade assembly 20, 21 has a combined arm portion 67 and backing strip portion 68 with spaced apertures 69, 70 formed in the mounting end of said arm portion 67. A bolt or fastener 71 passes first through an aperture 72 in the mounting tab 64 of the bracket 18 and then through the outboard apertures 69 of both arm portions 67 of the arm and blade assemblies 20, 21 with a nut or mating fastener 73 on the fastener 71 serving to lock both arm portions 67 to the bracket. Each arm portion 67 also has its aperture 70 aligned with and receiving therein one of the lugs 65 on the bracket 18 for the purpose of transferring torque to each of said arm and blade assemblies 20, 21.

Thus, both of the arm and blade assemblies 20, 21 are positively secured to the bracket assembly 18 which in turn is keyed to the drive shaft 50 such that oscillation of the shaft 50 through the mounting sleeve 51 will oscillate the bracket about the axis of the shaft 50. The bracket 50 will oscillate both arm and blade assemblies about a common axis. The nozzle 25 being on the pivot axis of the drive shaft 50 oscillates with the drive shaft 50, the bracket 18 and the arm and blade assemblies 20, 21 so that fluid discharged through apertures 27 and 28 will be directed ahead of and into the wiping facets of said arm and blade assemblies 20, 21 throughout the wiping cycle. Suitable pumps, reservoirs and controls are provided for initiating and terminating the flow of fluid through line 60 to the nozzle 25.

As seen in FIG. 5, each of the blade portions of the wiper arm and blade assemblies includes the backing strip portion 68 and a multifarious wiper element 74. The backing strip portion 68 is shaped to conform generally to the shape of the surface of the headlamp and may be somewhat flexible, as will appear hereinbelow, and has the multifarious wiping element 74 removably attached thereto.

As shown, the backing strip portion 68 includes an arcuate portion 76 having a plurality of key slots 77 therein with each slot consisting of a large rectangular portion 78 communicating with a narrower slot portion 80. The outboard end of the backing strip has a narrow slot of aperture 86 opening to the end of the strip.

The multifarious wiping element 74 as shown in FIG. 5 may be constructed of plastic or rubber and has an enlarged head portion 81 with a plurality of depending wiping facets 82 hinged thereto at 79 with each facet angularly related to the longitudinal axis of said head portion 81 and also angularly related to the direction of movement of the wiper arm and blade assemblies 20 and 21. The wiping facets 82 may be tapered on both sides and are located at desired intervals which allows the facets to deflect back, one beyond the other in slightly overlapping relationship. Each facet 82 is governed by its contact with lamp bulb surface and works independently but cooperatively with the others. The contact pressure of each facet 82 on the bulb surface is a function of the elasticity of the material and cantilever bending moment. This contact pressure breaks down the adhesion of foreign matter and removes it from the bulb. The facets 82 on the outermost portion of the wiping element 74 deflect or hinge a small amount compared to the deflection or hinging of the center members which yield and deflect greatly, due to the spherical contour of the lamp.

Each reversal of the direction of movement of the assemblies 20, 21 will initiate the hinging action of the facets 82 at the juncture point of the facets with the head portion 81. This hinging of facets 82 due to the angular relationship with head portion 81, will produce a shifting of positions with the outermost facets reaching out in one direction of oscillation and closing in on the next direction of oscillation, whereas the center facets will only exchange positions. This gives maximum coverage at the center and far-reaching coverage at the ends of the wiping element 74. The independence of the multiplicity of facets allows cleaning over any irregular surfaces and prevents possible locking on obstructions. Projecting upwardly from the head portion 81 are a plurality of T-shaped projections 83 along with an additional T-shaped projection 84 at the outboard end of the wiper element 74.

The wiper element 74 may be readily attached to the backing strip portion 68 by inserting the projections 83 through the large slots 78 and then pulling the wiper element 74 outboard so that the narrow undercut portions of the T-shaped projections enter the narrow slot portions 80 in said backing strip portion 68. At that point, the outboard projection 84 has not been inserted into the backing strip, however, by pulling the outboard end of the element 74 adjacent projection 84 until projection 84 clears the end of the backing strip and thereafter the end of the element 74 is released so that the undercut portion of projection 84 slides into the open ended aperture or slot 86 in the outboard end of the backing strip 68. As one alternative the wiper element 74 may be readily attached to the backing strip protion 68 by inserting the projection 84 into slot 86 in the outboard end of the backing strip 68, then stretching the wiper element 74 inboard so that the narrow undercut portion of the T-shaped projection 83 is inserted in the large slot 78 and upon release will seek out the narrow portion 77. This stretching, inserting and buttoning technique is applied to each of the T-shaped projections 83 and to every large slot 78 until the wiper element 74 is completely attached.

The narrow slot or aperture 86 is positioned so that the element 74 is stretched somewhat even with the insertion of projection 84 in aperture 86 to hold the element 74 firmly in position on the backing strip 68. The stretching effect of the flexible wiping element 74 is created by spacing the inner wall of aperture 86 a distance from the outer wall of the next nearest slot 80 slightly greater than the distance between the inner and outer walls of the two outboard projections 84 such as to place the wiping element 74 under tension when assembled with the backing strip 68. By selecting the appropriate stiffness or flexure to the backing strip 68 and positioning the projection 84 appropriately, the backing strip 68 may bend somewhat more after the flexible element 74 is completely attached thereto. This of course assists in holding the multifarious wiper element 74 in a proper wiping position on the headlamp surface.

As viewed in FIG. 1, by adjusting the gear ratios in housing 36 and the linkage elements 44, 46 and 48, one wiper blade element 21 may be eliminated and the arc of oscillation of the shaft 50 can be increased to approximately 180° whereupon the single wiper arm and blade assembly 20 will oscillate 90° in each direction from its illustrated position so as to wipe both headlamps 11 and 12. When only a single arm and blade assembly is used as just described, a longer period of time is required to completely clear the headlamps but under any circumstances the assembly is affective and does accomplish the intended purpose.

Turning now to the form of invention illustrated in FIGS. 6–16, a headlamp cleaner apparatus is shown for use in wiping a single headlamp arrangement 112. Many of the features of FIGS. 1–5 are similar to the features of FIGS. 6–16 and the description of the common features will not be repeated in detail hereinafter.

As is true in the dual arrangement of FIGS. 1–5, the drive mechanism 16 is attached to the plate 130 and support 114 and through the intermediary of the motor 41, gearing in the gear housing support 36, crank 44 and links 46 and 48, the drive shaft 150 is oscillated through approximately a 90° arc of movement to sweep the wiper arm and blade assembly 120 across the surface of the headlamp 112. As is true in FIGS. 1–5, the drive mechanism 16 is adapted for use on either the left or right side of the vehicle for driving the appropriate wiper arm and blade assemblies. The drive shaft 150 oscillates within a hollow mounting sleeve 151 which sleeve is secured to the plate 130 and passes through an aperture in the support 114.

The wiper arm and blade assembly 120 has an integrally connected arm portion 167 and backing strip portion 168. The shape of the backing strip portion 168 and the method of connection of the multifarious wiping element 174 to said backing strip portion 168 is the same as described with respect to FIGS. 1–5. As shown in FIG. 9, the arm portion 167 of the arm and blade assembly 120 has an offset portion 190 with a reduced projecting lug portion 191 extending axially away from the backing strip portion 168.

The bracket assembly 118 has a base portion 161 with an aperture 162 (FIG. 9) therethrough. Spaced from the aperture 162 and upturned from said base portion 161 is a flange 163 having a mounting tab 164 on the outer end thereof lying in a plane substantially parallel to the base portion 161. The base portion 161 also has an upturned leg 164a with an aperture 165 formed in the outer portion thereof. Said leg 164a is spaced from said flange 163 and from said aperture 162. The threaded end of the drive shaft 150 is passed through the aperture 162 in the bracket assembly 118 for keying and securing said drive shaft to said bracket assembly by means of a fastener 166 so that said shaft and bracket assembly will oscillate together. The junction between the flange 163 and the tab 164 has wall portions 171 formed on each side thereof and turned outwardly from said tab 164 so as to form a channel with the tab 164. The wall portions 171 not only form guides for the washer fluid conduit 195 but also strengthends the joint between the top of the flange 163 and the tab 161.

A bolt 130 passes through an aperture in the tab 164, through a spacer 197 (FIG. 11) and through an aperture 170 in the arm portion 167 of the wiper arm and blade assembly 120. A fastening member 199 is secured to the end of the fastener 130 to secure the wiper arm and blade assembly 120 to the bracket 118 and to hold the washer fluid conduit 195 in position with respect to the wiper arm and blade assembly 120. The projection 191 on the offset portion 190 of the arm portion 167 engages in the aperture 165 in the leg 164a of the bracket 118 so as to provide positive torque to the wiper arm assembly 120.

A flexible tube 194 is connected to the fluid conduit 195 which conduit 195 passes through and oscillates with the oscillating shaft 150 to transmit fluid from the reservoir and pump (both not shown) to a nozzle 196. As can be seen in dotted lines and solid lines in FIGS. 10 and 11, the conduit 195 and nozzle 196 are trapped between the tab 164 on the bracket 118, the one wall portion 171 on the tab, the spacer 197 surrounding the fastener 130, and the underside of the arm portion 167 of the arm and blade assembly. The opening in the nozzle 196 is aimed to propel washer fluid along a trajectory somewhat aligned with the leading edge of the facets 82 of the multifarious element 74. The stream of washing fluid follows a path that strikes the headlamp lens surface along the line parallel to the one edge of the head portion of the multifarious wiping element.

As the wiper assembly 120 moves to the right as viewed in FIG. 11, the facets 82 of the wiping element 74 lay back or hinge about the hinging point 179 as shown in FIG. 11 and FIG. 12 so that the trajectory of the washing fluid will be slightly ahead of the path of movement of the wiping element. As can be seen in FIG. 14, each facet 82 subscribes a path that slightly overlaps the path of the immediately adjacent facet, shaded areas 135 FIG. 14, so that in the areas of overlap which would be the weaker wiping areas of the facet a double wipe is provided thereby avoiding weakly wiped or unwiped areas. When the wiper element 120 reaches the limit of its oscillation in the righthand or counterclockwise direction as viewed in FIG. 11, the drive shaft and wiping element 120 is reversed and the facets 82 of the multifarious wiping element 74 flop over at the hinging point 179 and assume a posture as shown in FIG. 13 such that once again the trajectory of the spray of washer fluid is ahead of the path of movement of the various facets 82 of the wiping element. In the process of the facets 82 flopping over at the extremes of each oscillation and due to the diverting effect of wind currents and the like the stream of washer fluid will course between, through and over the many facets 82 of the wiper to flush the road grime from the wiper and to lubricate the facets for better cleaning of the headlamp.

Part of the advantages of my invention result from the improved cleaning of the surface by the multifarious wiping element 74. FIG. 15 shows one version of the novel cross-section of each facet 82 wherein each facet is tapered over about the bottom third of the length of the facet. Each facet is hinged at 179 to the head portion 81 and has parallel sides 88 extending to the junction of the tapered side 87. The tapered side 87 reduces the thickness of the facet 82 as the contact tip 90 is approached to produce gradually diminishing resistance to bending of said facet at the tip position. With the FIG. 15 version, the flexing of the facet is substantially uniform from the hinge 179 at the head portion to the tapered portion 87 whereupon the facet becomes gradually more flexible. In the illustrated form the taper 87 is on one side of one facet and on the opposite side of the next adjacent facet, this provides the advantage that after each hinging action of a facet a different form of surface is contacting the headlamp lens which produces a wipe less likely to be uniformly repetitious and therefore not likely to streak the surface of the headlamp.

The modified form of facet shown in FIG. 16 has the sides 91 of the facets uniformly sloping from the hinge 179 at the root or base of the facet at head portion 81 and tapers gradually all the way to the wiping edge or tip 90. This form has a tendency to more uniformly vary in flexibility throughout the full length of each facet. Depending upon the degree of curvature or undulations of the surface being cleaned, one or the other of the above have particular advantages. Unlike cleaning windshields where a high degree of cleaning for visibility purposes is involved, the present improved system is designed to cope with the compound road filth constantly bombarded onto the headlamp lenses and to loosen and scrub away said filth.

The Federal Government has adopted regulations specifying what parameters must be met in the way of cleaning headlamps so that the illuminating ability thereof will be maintained an optimum efficiency. The regulations, briefly stated, specify that a headlamp whose illuminating ability is reduced by 80% by road filth must be returned to 80% illuminating capability within 30 seconds. My improved assembly will restore the 80% deficient headlamp to 90% efficient in six wiping cycles (a cycle being once over and back) and in a total elapse time of 8-10 seconds, well within specified standards.

I claim:

1. A method of assembling a wiper blade assembly having a wiper arm and backing strip element and a flexible wiping element comprising the steps of inserting at least one projection on the back of the wiping element into at least one aperture in said backing strip element, elongating said wiping element so as to align at least one additional projection on the back of the wiping element with at least one additional aperture in said backing strip element, inserting said additional projection in said additional aperture whereupon release of said elongation will nest said projection with said aperture and will leave said wiping element under some tension between said projections.

* * * * *